(12) United States Patent
Takashima et al.

(10) Patent No.: US 7,983,416 B2
(45) Date of Patent: Jul. 19, 2011

(54) INFORMATION PROCESSING DEVICE, INFORMATION PROCESSING METHOD, AND COMPUTER PROGRAM

(75) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 11/841,235

(22) Filed: Aug. 20, 2007

(65) Prior Publication Data

US 2008/0063194 A1    Mar. 13, 2008

(30) Foreign Application Priority Data

Sep. 9, 2006    (JP) ................................ P2006-244907

(51) Int. Cl.
    *H04L 7/67*    (2006.01)
(52) U.S. Cl. ............. 380/201; 380/203; 726/31; 726/32; 726/33
(58) Field of Classification Search ....................... 726/29
    See application file for complete search history.

(56) References Cited

U.S. PATENT DOCUMENTS

| | | | | |
|---|---|---|---|---|
| 4,972,474 A | * | 11/1990 | Sabin | 380/28 |
| 5,365,516 A | * | 11/1994 | Jandrell | 370/335 |
| 5,388,074 A | * | 2/1995 | Buckenmaier | 365/189.05 |
| 5,657,398 A | * | 8/1997 | Guilak | 382/232 |
| 5,894,494 A | * | 4/1999 | Davidovici | 375/150 |
| 6,249,824 B1 | * | 6/2001 | Henrichs | 710/8 |
| 6,367,019 B1 | * | 4/2002 | Ansell et al. | 726/26 |
| 2002/0176575 A1 | * | 11/2002 | Qawami et al. | 380/201 |

FOREIGN PATENT DOCUMENTS

| | | |
|---|---|---|
| JP | 5-257816 | 10/1993 |
| JP | 10-083297 | 3/1998 |
| JP | 2003-008567 | 1/2003 |
| JP | 2003-116100 | 4/2003 |
| JP | 2004-311000 | 11/2004 |
| JP | 2006-72688 | 3/2006 |
| WO | WO 2006/011527 A1 | 2/2006 |

OTHER PUBLICATIONS

Office Action issued in Japanese Patent Application No. 2006-244907 on Nov. 9, 2010.

* cited by examiner

*Primary Examiner* — Kambiz Zand
*Assistant Examiner* — Dant B Shaifer Harriman
(74) *Attorney, Agent, or Firm* — Oblon, Spivak, McClelland, Maier & Neustadt, L.L.P.

(57) ABSTRACT

An information processing device that executes processing for outputting recording data to an information recording medium includes a storing unit that stores common data that includes encrypted content, key information applied to decoding of the encrypted content, and content management information and, data content of which is unchanged even if a medium as a data recording destination is changed, a media-specific-data generating unit that generates media specific data, data content of which is changed according to the medium as the data recording destination, an output-data generating unit that generates output data based on the common data and the media specific data, and a data outputting unit that outputs the data generated by the output-data generating unit.

10 Claims, 12 Drawing Sheets

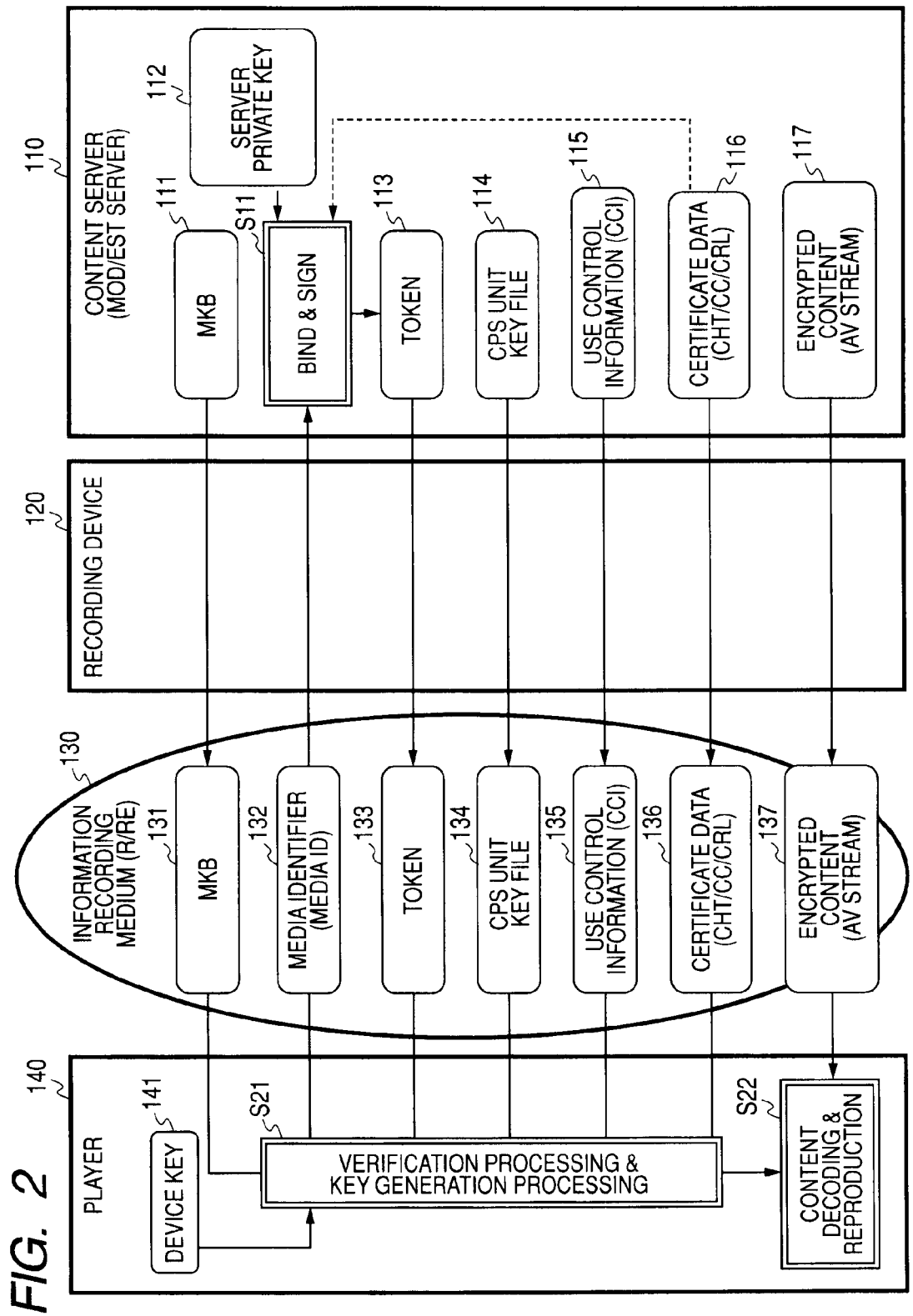

TOKEN

CONTENT CERTIFICATE

INFORMATION PROCESSING DEVICE, INFORMATION PROCESSING METHOD, AND COMPUTER PROGRAM

CROSS-REFERENCES TO RELATED APPLICATIONS

The present invention contains subject matter related to Japanese Patent Application JP 2006-244907 filed in the Japanese Patent Office on Sep. 9, 2006, the entire contents of which being incorporated herein by reference.

BACKGROUND OF THE INVENTION

1. Field of the Invention

The present invention relates to an information processing device, an information processing method, and a computer program. More specifically, the present invention relates to an information processing device, an information processing method, and a computer program for performing processing for providing content, which is an object of use control, and processing for recording the content in a recording medium.

2. Description of the Related Art

Recently, a DVD (Digital Versatile Disc), a Blu-ray Disc (registered trademark), and the like are used as recording media for content such as music and movies. These information recording media include a medium to which data is recorded in advance and which does not allow writing of new data (ROM type) and a data-writable medium (R type, RE type, etc.). A user is capable of recording a variety of contents via, for example, a network and an apparatus set in a public place by using the data-writable information recording medium.

However, the copyrights, the distribution rights, and the like of most of contents such as music data and image data are retained by creators or distributors thereof. In the distribution of the contents, it is a general practice to impose a certain restriction on the use of the contents, i.e., license only regular users to use the content to prevent illegal copying and the like.

As one of the methods of restricting the use of content, there is a system that encrypts and distributes content and allows only users and apparatuses having proper rights of the use of the content to decrypt the content. A system that encrypts content to control the use of the content is described in, for example, JP-A-2003-116100.

As a standard concerning content copyright protection techniques for realizing a content use form based on the encryption of content, there is the AACS (Advanced Access Content System). Under the standard of the AACS, content is sectioned as units and encrypted content to which unit keys corresponding to the respective units are applied is recorded in a disk. Unit key files in which the unit keys are stored are recorded in the disk as files in which encrypted unit keys are recorded. An MKB (Media Key Block), which is an encrypted block, is also recorded in the disk.

The MKB is an encryption key block generated on the basis of a key distribution system of a tree structure known as one form of a broadcast encryption system. With the MKB, a media key [Km] can be acquired only by processing (decoding) based on a device key [Kd] stored in an information processing device of a user who has a valid license. The user uses the media key [Km] to decode the encrypted unit keys included in the unit key files and acquire the unit keys and decodes the encrypted content using the unit keys.

The control of the use of content by units is realized by sectioning the content by units and allocating the unit keys, which are the encryption keys different for each of the units, to the content to encrypt the content.

When a medium, for example, a disk, having content stored therein is a ROM type disk that allows only reproduction, additional recording of new content in the disk and editing of the new content are not executed. Therefore, the content and key information recorded in the disk are fixed and do not need to be changed. On the other hand, in a content use form in which a medium of the R type, the RE type, or the like that allows writing of data is used, content recorded in the disk is not fixed and processing such as recording of new additional content and deletion and update of the recorded content is executed. According to the deletion and the update of data, processing for adding and deleting unit keys is also necessary.

As processing for recording new content in a disk, for example, processing for downloading content from a content server and recording the content in a medium of the R type, the RE type, or the like and processing for recording the content in the medium of the R type, the RE type, or the like using a terminal placed in a shop or a public space are conceivable.

When content is recorded in a medium anew and provided to a user as described above, the control of use corresponding to respective contents to be provided is necessary. When the medium is a ROM type disk, it is possible to adopt a fixed use control system corresponding to fixed content recorded in the medium. However, in a system that appropriately records content in a medium in which additional recording is possible such as the medium of the R type or the RE type, it is necessary to add or update use control information, key information, and the like in association with content recorded in the medium anew.

SUMMARY OF THE INVENTION

Therefore, it is desirable to provide, in a system that provides a user with content by recording the content in a data-writable medium, an information processing device, an information processing method, and a computer program that make it possible to efficiently execute processing for providing and recording contents, each of which can be controlled to be used.

According to an embodiment of the present invention, there is provided an information processing device that executes processing for outputting recording data to an information recording medium, the information processing device including a storing unit that stores common data that includes encrypted content, key information applied to decoding of the encrypted content, and content management information and, data content of which is unchanged even if a medium as a data recording destination is changed, a media-specific-data generating unit that generates media specific data, data content of which is changed according to the medium as the data recording destination, an output-data generating unit that generates output data based on the common data and the media specific data, and a data outputting unit that outputs the data generated by the output-data generating unit.

Preferably, the media-specific-data generating unit executes processing for inputting a media identifier specific to the medium as the data recording destination and generating media specific data including electronic signature data corresponding to data including the media identifier.

Preferably, the media-specific-data generating unit executes processing for inputting a media identifier specific to the medium as the data recording destination and identification information of a content certificate included in the content management information and generating media specific data including electronic signature data corresponding to data including the media identifier and the content certificate.

Preferably, the output-data generating unit sets the common data and the medium specific data as different data blocks and generates output data in a unit of the set data blocks and the data outputting unit executes processing for outputting the data in a unit of the data blocks.

Preferably, the output-data generating unit sets data including the common data and obtained by replacing the media specific data with dummy data as first output data and sets the media specific data as second output data to generate two output data and the data outputting unit executes processing for outputting the first output data and the second output data.

Preferably, the output-data generating unit generates common-data-file output data formed by a file or a file package including the common data and media-specific-data-file output data formed by a file or a file package including the media specific data and the data outputting unit executes processing for outputting the common-data-file output data and the media-specific-data-file output data.

According to another embodiment of the present invention, there is provided an information processing device that executes processing for recording input data in an information recording medium, the information processing device including a data inputting unit that inputs common data that includes encrypted content, key information applied to decoding of the encrypted content, and content management information and, data content of which is unchanged even if a medium as a data recording destination is changed, and media specific data, data content of which is changed according to the medium as the data recording destination, and a data recording unit that executes processing for recording input data inputted via the data inputting unit in the medium. The data recording unit executes processing for recording a file system image including the common data and the media specific data in the medium.

Preferably, the data inputting unit inputs block-identifiable data in which the common data and the media specific data are set in separate data blocks and the data recording unit identifies, on the basis of the block-identifiable data, the common data and the media specific data and executes data recording processing.

Preferably, the data inputting unit inputs first input data including the common data and obtained by replacing the media specific data with dummy data and second input data including the media specific data and the data recording unit records the first input data in the medium and, then, overwrites or logically overwrites the second input data on the dummy data of the first input data.

Preferably, the data inputting unit inputs a common data file formed by a file or a file package including the common data and a media specific data file formed by a file or a file package including the media specific data and the data recording unit generates a file system image based on the common data file and the media specific data file and records data in the medium.

According to still another embodiment of the present invention, there is provided an information processing method of executing processing for outputting recording data to an information recording medium in an information processing device, the information processing method including a media-specific-data generating step of generating, in a media-specific-data generating unit, media specific data, data content of which is changed according to a medium as a data recording destination, an output-data generating step of acquiring, in an output-data generating unit, common data that includes encrypted content, key information applied to decoding of the encrypted content, and content management information and, data content of which is unchanged even if the medium as the data recording destination is changed, from a storing unit and generating output data based on the common data and the media specific data, and a data outputting step of outputting, in a data outputting unit, the data generated in the output-data generating step.

Preferably, the media-specific-data generating step is a step of executing processing for inputting a media identifier specific to the medium as the data recording destination and generating media specific data including electronic signature data corresponding to data including the media identifier.

Preferably, the media-specific-data generating step is a step of executing processing for inputting a media identifier specific to the medium as the data recording destination and identification information of a content certificate included in the content management information and generating media specific data including electronic signature data corresponding to data including the media identifier and the content certificate.

Preferably, the output-data generating step is a step of setting the common data and the medium specific data as different data blocks and generating output data in a unit of the set data blocks and the data outputting step is a step of executing processing for outputting the data in a unit of the data blocks.

Preferably, the output-data generating step is a step of setting data including the common data and obtained by replacing the media specific data with dummy data as first output data and setting the media specific data as second output data to generate two output data and the data outputting step is a step of executing processing for outputting the first output data and the second output data.

Preferably, the output-data generating step is a step of generating common-data-file output data formed by a file or a file package including the common data and media-specific-data-file output data formed by a file or a file package including the media specific data and the data outputting step is a step of executing processing for outputting the common-data-file output data and the media-specific-data-file output data.

According to still another embodiment of the present invention, there is provided an information processing method of executing processing for recording input data in an information recording medium in an information processing device, the information processing method including a data inputting step of inputting, in a data inputting unit, common data that includes encrypted content, key information applied to decoding of the encrypted content, and content management information and, data content of which is unchanged even if a medium as a data recording destination is changed, and media specific data, data content of which is changed according to the medium as the data recording destination, and a data recording step of executing, in a data recording unit, processing for recording input data inputted via the data inputting unit in the medium. The data recording step is a step of executing processing for recording a file system image including the common data and the media specific data in the medium.

Preferably, the data inputting step is a step of inputting block-identifiable data in which the common data and the media specific data are set in separate data blocks and the data recording step is a step of identifying, on the basis of the block-identifiable data, the common data and the media specific data and executing data recording processing.

Preferably, the data inputting step is a step of inputting first input data including the common data and obtained by replacing the media specific data with dummy data and second input data including the media specific data and the data recording step is a step of recording the first input data in the medium and, then, overwriting or logically overwriting the second input data on the dummy data of the first input data.

Preferably, the data inputting step is a step of inputting a common data file formed by a file or a file package including the common data and a media specific data file formed by a file or a file package including the media specific data and the data recording step is a step of generating a file system image based on the common data file and the media specific data file and recording data in the medium.

According to still another embodiment of the present invention, there is provided a computer program for causing an information processing device to execute processing for outputting recording data to an information recording medium, the computer program causing the information processing device to execute a media-specific-data generating step of causing a media-specific-data generating unit to generate media specific data, data content of which is changed according to a medium as a data recording destination, an output-data generating step of causing an output-data generating unit to acquire common data that includes encrypted content, key information applied to decoding of the encrypted content, and content management information and, data content of which is unchanged even if the medium as the data recording destination is changed, from a storing unit and generate output data based on the common data and the media specific data, and a data outputting step of causing a data outputting unit to output the data generated in the output-data generating step.

According to still another embodiment of the present invention, there is provided a computer program for causing an information processing device to execute processing for recording input data in an information recording medium, the computer program causing the information processing device to execute a data inputting step of causing a data inputting unit to input common data that includes encrypted content, key information applied to decoding of the encrypted content, and content management information and, data content of which is unchanged even if a medium as a data recording destination is changed, and media specific data, data content of which is changed according to the medium as the data recording destination, and a data recording step of causing a data recording unit to execute processing for recording input data inputted via the data inputting unit in the medium. The data recording step is a step of causing the data recording unit to execute processing for recording a file system image including the common data and the media specific data in the medium.

The computer program according to the embodiment of the present invention is, for example, a computer program that can be provided to a computer system, which is capable of executing various program codes, by a storage medium provided in a computer readable format or a communication medium, for example, a recording medium such as a DVD, a CD, or an MO or a communication medium such as a network. By providing such a program in the computer readable format, processing corresponding to a program is realized on a computer system.

Other objects, characteristics, and advantages of the present invention will be made apparent through more detailed explanation based on embodiments of the present invention described later and accompanying drawings. A system in this specification is a logical set of plural apparatuses and is not limited to a system in which apparatuses of respective structures are provided in the same housing.

According to an embodiment of the present invention, in the system that records content to be subjected to use control in a data-writable medium of the R type or the RE type using download from a server or a public terminal, media specific data and common data, which is not specific to the medium, are sectioned and managed and these respective data are set to be identifiable and outputted from the server to a recording device. According to the application of the system, the server is capable of storing one set of common data independent of a medium and generating and outputting data specific to the medium one by one. In data output processing, efficiency of data output processing in the server is improved by performing processing for outputting the common data and the media specific data as separate blocks and processing for outputting data in which dummy data is set and replacing the dummy data with the media specific data. This makes it possible to perform efficient and sure data recording in the recording device that records data.

BRIEF DESCRIPTION OF THE DRAWINGS

FIG. 2 is a diagram for explaining processing executed by a content server and a structure of data stored in an information recording medium;

DESCRIPTION OF THE PREFERRED EMBODIMENTS

Details of an information processing device, an information processing method, and a computer program according to embodiments of the present invention will be hereinafter explained with reference to the accompanying drawings. The explanation will be made in accordance with the following items:

1. an example of a system that provides content according to an embodiment of the present invention;

2. processing for providing content by a content server; and
3. a structure of an information processing device.

1. an example of a system that provides content according to an embodiment of the present invention First, an example of a system that provides content according to an embodiment of the present invention will be explained with reference to FIGS. 1A and 1B. The present invention is applicable to, for example, a system in which a user records content in a data-writable information recording medium of an R type, an RE type, or the like at arbitrary timing and is provided with the content. As processing for recording new content in the information recording medium and providing the user with the new content, for example, as shown in FIG. 1A, downloading content from a content server 14 connected to the system via a network and recording the content in a data writable medium, for example, a medium of the R type or the RE type or processing for recording content in the medium of the R type, the RE type, or the like using a content server placed in a shop or a public space as shown in FIG. 1B are conceivable.

Figure 1B:
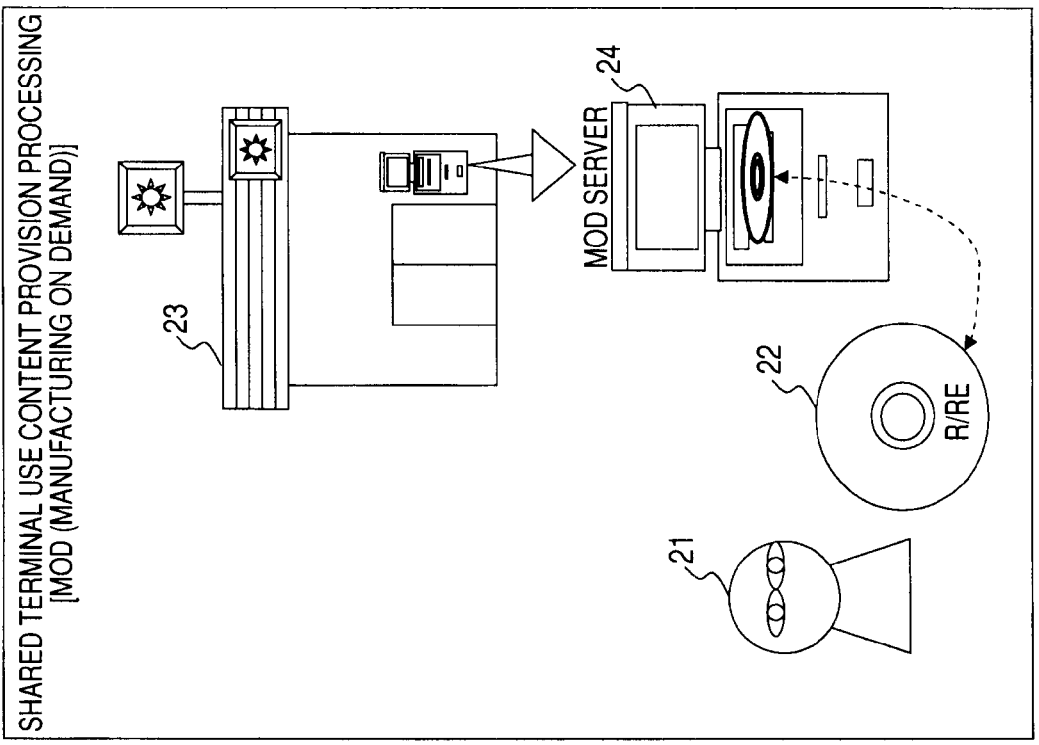
FIGS. 1A and 1B are diagrams for explaining examples of systems according to an embodiment of the present invention.
Figure 1A:
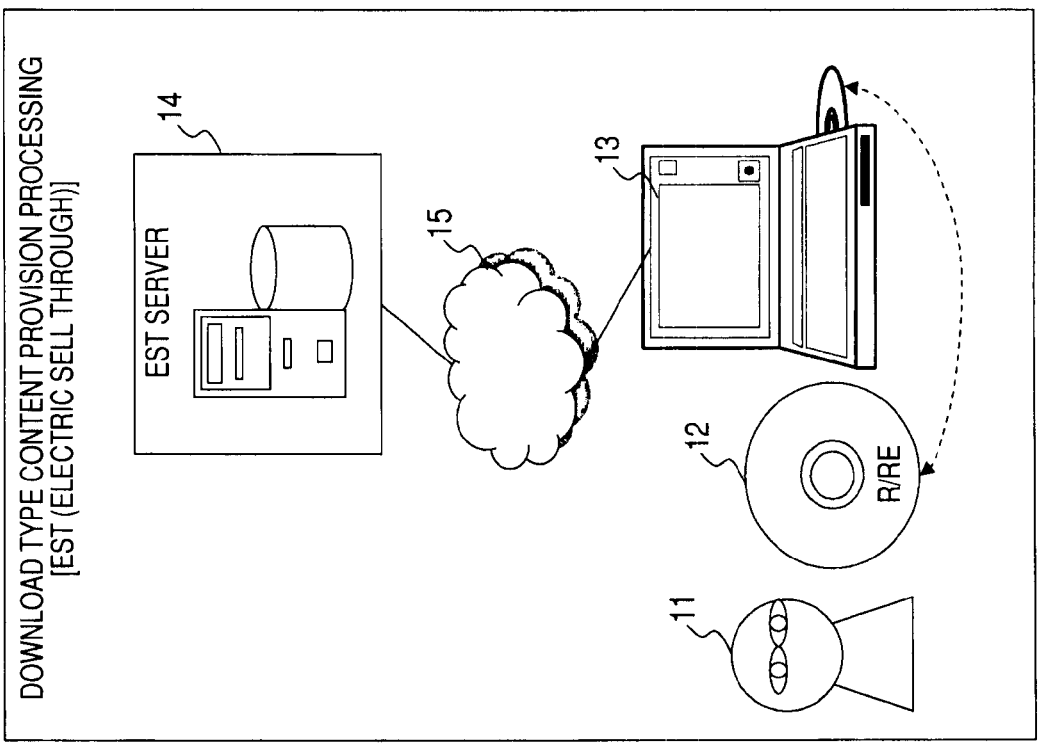

The example of the processing shown in FIG. 1A is processing for inserting a medium held by a user 11, for example, a disk 12 of the R type or the RE type, which is a data writable medium, specifically, a DVD, a Blu-ray Disc (registered trademark), or the like in an information processing device 13 such as a PC held by the user 11 and receiving content from the content server 14 via a network 15 and recording the content. This content provision processing is content provision processing of a download type and is called EST (Electric Sell Through). The content server 14 is referred to as an EST server.

An example of processing shown in FIG. 1B is an example in which a user 21 records and purchases content using a content server 24 serving as a terminal set in a public space such as a convenience store or a station. The example of processing is processing for setting a disk 22 of the R type or the RE type, which is a data-writable medium held by the user 21, for example, a DVD or a Blu-ray Disc (registered trademark) in a content server 24 serving as a terminal in a convenience store 23 and recording desired content in the disk 22 according to operation such as selection of content by the user 21. This content provision processing is shared terminal use content provision processing and is referred to as an MoD (Manufacturing on Demand). The content server 24 is referred to as an MoD.

When such content provision processing is performed, if content to be provided is, for example, content as an object of copyright protection, use control is necessary to prevent disordered use of the content. As described above, as a standard concerning a technique for protecting a copyright of content, there is the AACS (Advanced Access Content System). Under the AACS, content is sectioned as units and encrypted content to which unit keys corresponding to the respective units are applied is recorded in a disk.

For example, when a disk is a ROM type disk that allows only reproduction, additional recording of new content in the disk and editing of the new content are not executed. Therefore, it is possible to provide the user with a unit key file in which the unit keys corresponding to contents recorded in the disk are stored and use control information corresponding to the recorded contents in a state in which the unit key file and the use control information are recorded in the disk. However, in a content use form in which a medium of the R type, the RE type, or the like that allows writing of data is used, content recorded in the disk is not fixed and processing such as recording of new additional content and deletion and update of the recorded contents is executed. According to the deletion and the update of data, processing for adding and deleting unit keys is also necessary.

In other words, unit keys corresponding to content recorded by the user anew and addition and update of disk recording information for surely performing use control corresponding to respective contents such as use control information are necessary.

2. processing for providing content by the content server

Details of processing executed by an apparatus that additionally records content in the data-writable medium of the R type, the RE type, or the like and provides the content, i.e., the content server shown in FIGS. 1A and 1B will be explained.

FIG. 2 is a diagram showing, from the right to the left, a content server 110, a recording device 120 that executes processing for recording content in a data-writable medium of the R type, the RE type, or the like, a disk 130 as the data-writable medium of the R type, the RE type, or the like, and a player 140 in which the disk 130 is inserted to play the disk 130.

In the system for content provision processing of the download type (EST (Electric Sell Through) ) shown in FIG. 1A, the content server 110 shown in FIG. 2 is equivalent to the content server 14 shown in FIG. 1A. The recording device 120 and the player 140 shown in FIG. 2 are equivalent to the information processing device 13 such as the PC owned by the user shown in FIG. 1A.

In the case of the system for shared terminal use content provision processing (Mod (Manufacturing on Demand)) shown in FIG. 1B, the content server 110 and the recording device 120 shown in FIG. 2 are equivalent to the content server 24 shown in FIG. 1B. The player 140 shown in FIG. 2 is equivalent to a player, which is not shown in FIG. 1B, owned by the user.

The content server 110 shown in FIG. 2 records new content in, for example, the data-writable information recording medium 130 owned by the user and records various data for realizing use control corresponding to the recorded content, for example, unit keys applied to decoding of the content and use control information.

First, before explaining the processing executed by the content server, data recorded in the information recording medium 130 will be explained. The information recording medium 130 shown in FIG. 2 is a data-writable medium. Specifically, the information recording medium 130 is, for example, a Blu-ray disc (registered trademark), a DVD disk, or the like of the R type or the RE type. Besides encrypted content 137, various data are recorded in the information recording medium 130. These data are data necessary for use control of the content and are basically data necessary for use control of the content. Moreover, the data are data recorded for realizing content use control according to the provision of the AACS. First, an overview of these data will be explained.

The encrypted content 137 recorded in the information recording medium 130 is an AV (Audio Visual) stream of a moving image content such as an HD (High Definition) movie content, which is high-definition moving image data or a content including music data, a game program, an image file, sound data, and text data.

Content stored in the information recording medium 130 is allocated with a key (a CPS unit key or a unit key (or which may be referred to as a title key) different for each of units, encrypted, and stored in order to realize use control different for each of sectioned data by units. A content unit to which one unit key is allocated is referred to as a content management unit (a CPS unit).

Data other than the encrypted content 137 will be explained.

(1) MKB

An MKB (Media Key block) 131 is an encryption key block generated on the basis of a key delivery system of a tree structure known as a form of the broadcast encryption system. The MKB 131 is a key information block that allows a user having a valid license to acquire a media key [Km], which is a key necessary for decoding of content, only with processing (decoding) based on a device key [Kd] stored in an information processing device of the user. An information delivery system according to a so-called hierarchical tree structure is applied to the MKB 131. The MKB 131 allows a user device (an information processing device) to acquire the media key [Km] only when the user device has a valid license and disallows the user device to acquire the media key [Km] when the user device is revoked (subjected to revoke processing).

A management center as a license manager concerning content use can generate an MKB that may not be able to be decoded by a device key stored in a specific user device when a device key used for encryption of key information stored in the MKB is changed. In other words, the management center can generate an MKB with which a media key necessary for content decoding may not be able to be acquired. Therefore, it is possible to eliminate (revoke) an illegal device at arbitrary timing and provide only a device having a valid license with decodable encrypted content.

(2) Media Identifier

A media identifier (a media ID) 132 is identification information specific to a disk as an information recording medium, for example, a serial number individually set for the disk. In general, a media identifier is recorded in a region different from a data recording region. In order to prevent rewriting, the media identifier is physically written in an inner circumferential region of the disk, for example.

(3) Token

Figure 3:
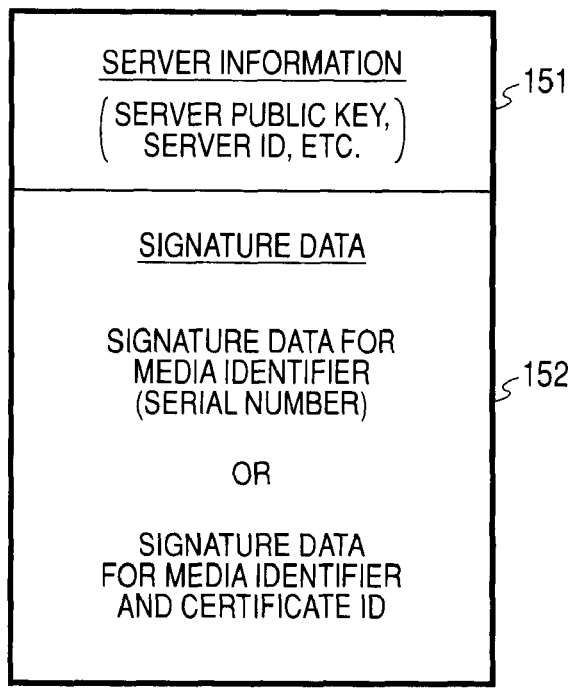
FIG. 3 is a diagram for explaining an example of a data structure of a token, which is a media specific data.

A token 133 is data applied to the content recording system according to the embodiment of the present invention. The token 133 is generated and recorded by an apparatus that provides content, for example, the content server 14 shown in FIG. 1A or the content server 24 serving as the terminal shown in FIG. 1B. An example of a data structure of the token 133 will be explained with reference to FIG. 3. The token 133 includes, as shown in FIG. 3, server information 151 of a content server that executes processing for providing content and signature data 152 generated by applying a private key of the content server to identification information of an information recording medium in which content is about to be recorded, i.e., data including the media identifier 132. The signature data 152 may be signature data corresponding to data including a media identifier and a certificate data ID of, for example, a content certificate.

The token 133 recorded in the information recording medium 130 shown in FIG. 2 is read by the player 140 when the player 140 is about to decode and reproduce the encrypted content 137. Then, processing for verifying an electronic signature, to which a public key of the content server is applied, and checking correctness of the token 133 is executed. According to this processing, after it is confirmed that a supply source of the encrypted content 137 is a proper apparatus, decoding of the content is permitted.

(4) CPS Unit Key File

As described above, in order to manage the use of contents, contents are respectively subjected to encryption, to which individual encryption keys (CPS unit keys) are applied, and stored in the information recording medium 130. In other words, AV (Audio Visual) streams and the like forming the contents are sectioned into units as units of management of content use and encrypted by a unit key different for each of the sectioned units.

Therefore, when content reproduction is executed by the player 140, it is necessary to generate CPS unit keys corresponding to the respective CPS units and perform decoding processing. The CPS unit keys are stored in a CPS unit key file 134. The CPS unit key file 134 is a file in which encrypted unit keys are recorded. When content reproduction is executed, it is necessary to decode the encrypted unit keys included in the CPS unit key file 134 in a predetermined sequence.

Specifically, it is possible to decode the encrypted unit keys by applying the media key [Km], which can be acquired from the MKB 131, and other data thereto only when the player 140 as the user device has a valid license.

(5) Use Control Information

Use control information 135 includes, for example, copy/reproduction control information (CCI). In other words, the use control information 135 is copy restriction information and reproduction restriction information for use control corresponding to the encrypted content 137 stored in the information recording medium 130. This copy/reproduction control information (CCI) can be set in various ways. For example, the copy/reproduction control information (CCI) is set as individual information of a CPS unit set as a content management unit and is set in association with plural CPS units.

(6) Certificate Data

Certificate data 136 is specifically data including a content certificate (CC), a content hash table (CHT), and a certificate revocation list (CRL).

Figure 4:
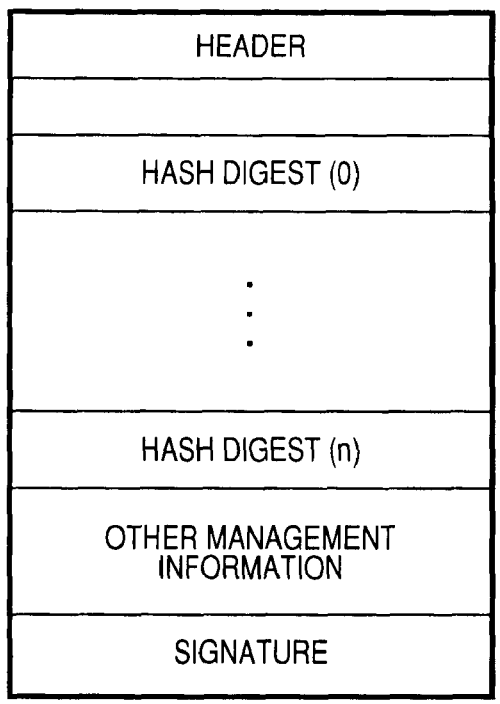
FIG. 4 is a diagram for explaining an example of a data structure of a content certificate.

The content hash table (CHT) is a table in which a hash value generated from constituent data of the encrypted content 137 is stored. The content certificate (CC) is a certificate for indicating correctness of content stored in an information recording medium. As shown in FIG. 4, data of content hash digests and the like based on hash units for collation stored in the content hash table (CHT) are stored in the content certificate (CC). An electronic signature is added to the data by the management center serving as a content administrator. A header section of the content certificate includes an identifier (ID) and the like of the content certificate.

Figure 5:
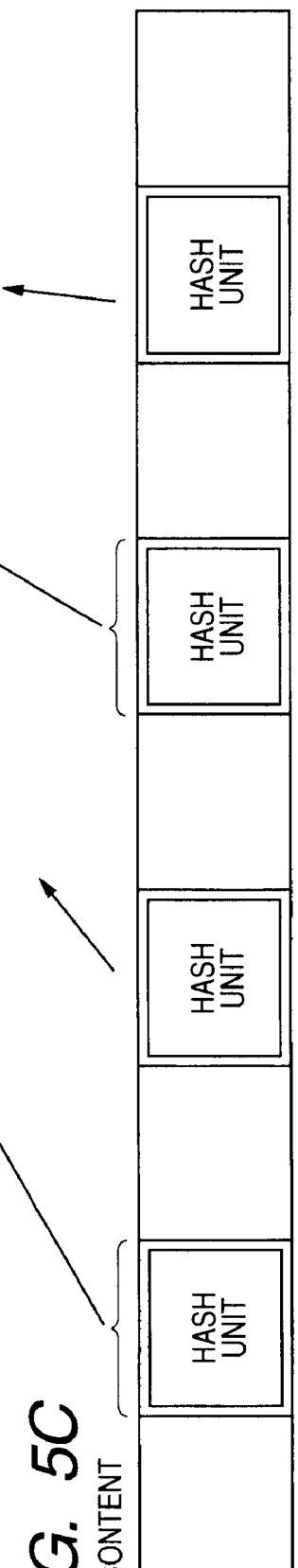
FIGS. 5A is a diagram for explaining an example of a structure of the content certificate.
FIG. 5B is a diagram for explaining an example of a structure of a content hash table.
FIG. 5C is a diagram for explaining constituent data of content.

The hash digests registered in the content certificate will be further explained with reference to FIGS. 5A to 5C. FIG. 5A is a diagram showing a structure of the content certificate. In the content certificate, plural hash digests (0) to (n) are registered following a header and a signature is added after the hash digests.

The hash digests are digest values of hash units registered in a content hash table shown in FIG. 5B. The content hash table is set in association with contents recorded in the information recording medium. For example, one content hash table is set in association with one CPS unit. Plural content hashes are recorded in the content hash table.

The content hashes are hash values generated on the basis of hash units (e.g., 192 KB) selected from constituent data of content shown in FIG. 5C. FIG. 5C is a diagram showing one content belonging to, for example, one CPS unit. Plural data sections are set as hash units from this content. Hash values calculated on the basis of constituent data of the respective hash units are recorded in the content hash table.

A new hash value is calculated on the basis of the entire registered data of the content hash table and registered in the content certificate shown in FIG. 5A as a hash digest. In other words, the hash digest is a hash value set for each content (CPS unit) recorded in the information recording medium.

The content hash table shown in FIG. 5B is applied to, for example, processing for verifying manipulation of content executed before content reproduction is executed. The processing is, for example, processing for selecting a hash unit set in reproduction object content, calculating a hash value in accordance with a hash value calculation algorithm decided in advance, and judging whether the content is manipulated according to whether this calculated hash value coincides with the content hashes registered in the content hash table.

The certificate revocation list (CRL) is a list for judging validity of public key certificates of various apparatuses such as the player 140 that executes content reproduction. In other words, the certificate revocation list is a list of processing for revoked public key certificates. It is confirmed that public key certificates recorded in this certificate revocation list (CRL) are revoked public key certificates. The player 140 can judge, on the basis of this list, validity and the like of a key applied to content reproduction.

Referring back to FIG. 2, processing by the content server 110 will be explained. Among the various data recorded in the information recording medium 130, the media identifier 132 is recorded by, for example, physical cutting processing during the manufacturing of the information recording medium 130. However, the other data are provided and recorded by the content server 110 during recording of content.

As shown in FIG. 2, the content server 110 performs processing for retaining or sequentially generating an MKB 111, a token 113, a CPS unit key file 114, use control information (CCI) 115, certificate data (CHT/CC/CRL) 116, and encrypted content 117 and applying the recording device 120 to the data to record the data in the information recording medium 130.

As explained with reference to FIG. 3, the token 113 is data including signature data generated on the basis of the media identifier 132 recorded in the information recording medium 130. The content server 110 acquires the media identifier 132 recorded in the information recording medium 130 and applies a server private key 112 retained by the content server 110 to the media identifier 132 as well as the other data such as the certificate data ID to generate signature data. This processing is processing step S11 executed by the content server 110 shown in FIG. 2.

The token 113 generated by the processing in step S11 and the other data are recorded by the recording device 120. As a result, as shown in the figure, the respective data such as the encrypted content 137 are recorded in the information recording medium 130.

In content reproduction, in step S21 shown in the figure, the player 140 executes key generation processing and data verification processing based on the respective data recorded in the information recording medium 130 and acquires a CPS unit key necessary for decoding encrypted content. In step S22, the player 140 executes decoding and reproduction of the encrypted content. The processing in step S21 includes processing for acquiring the media key [Km] from the MKB 131 using the device key [Kd] 141 retained by the player 140, processing for decoding an encrypted unit key included in the CPS unit key file 134, and processing for verifying the token 133. The verification of the token 133 includes signature verification processing to which the public key of the content server 110 is applied. Confirmation of the completion of the signature verification is a condition for content reproduction.

As explained with reference to FIG. 2, the content server 110 provides, besides content, various management information for recording the content in the information recording medium. The processing for acquiring information and processing for generating information in the content server 110 will be explained with reference to FIG. 6.

Figure 6:
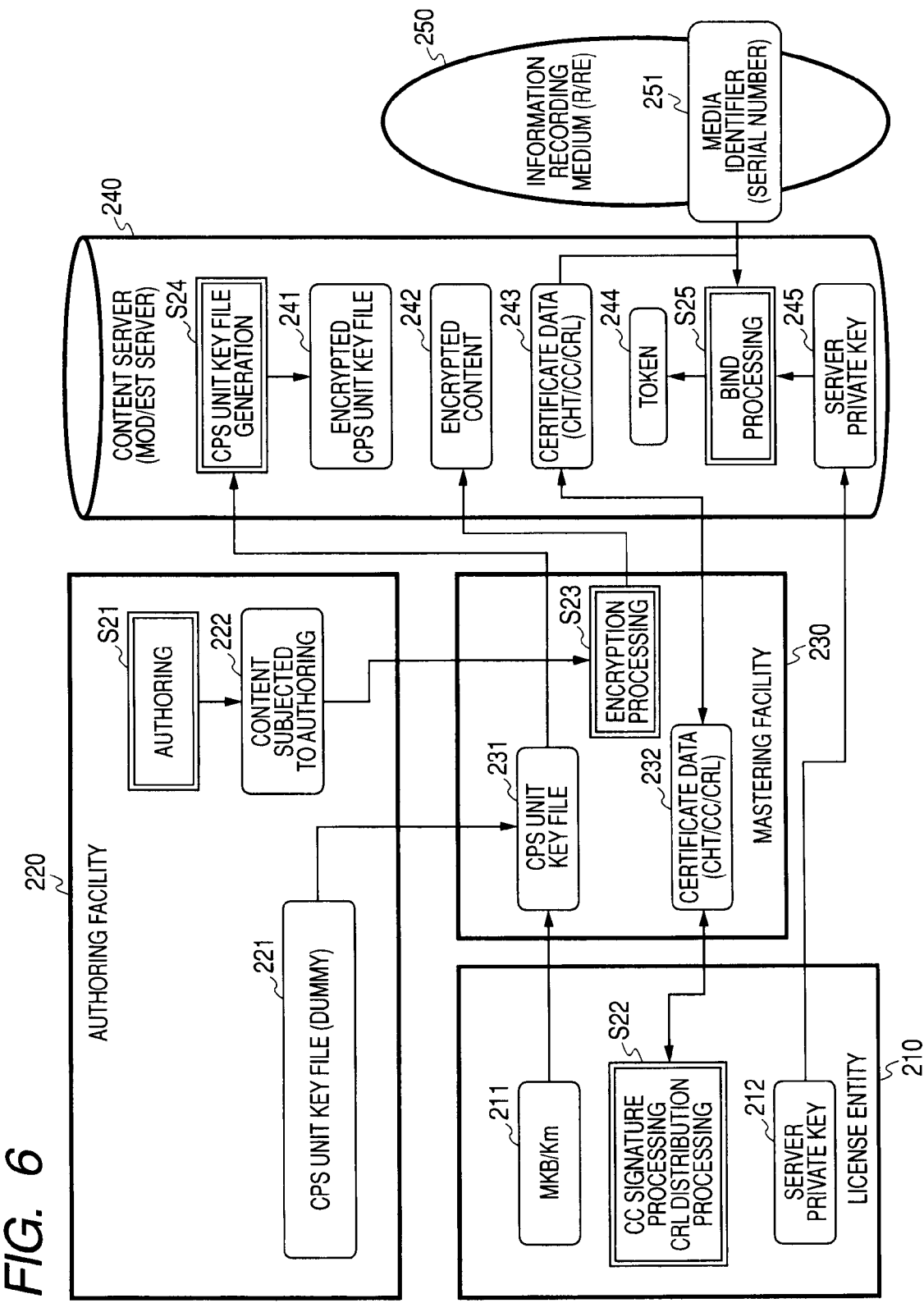
FIG. 6 is a diagram for explaining an example of processing for generating and acquiring data provided by the content server.

FIG. 6 is a diagram showing a license entity 210 that executes processing for managing content, an authoring facility 200 that executes processing for editing the content (authoring), a mastering facility 230 that generates master data of information recorded in an information recording medium, and a content server (an MoD/EST server) 240.

First, in step S21, the authoring facility 220 edits the content (authoring) and generates content subjected to authoring 222. At this point, a CPS unit as an encryption unit of content is sectioned. However, the authoring facility 220 does not retain a CPS unit key applied to encryption of the CPS unit. Thus, the authoring facility 220 does not executes encryption by a CPS unit key but generates a CPS unit key file (dummy) 221 in which empty dummy data corresponding to the CPS unit sections are set and provides the CPS unit key file (dummy) 221 to the mastering facility 230 together with the content subjected to authoring 222.

The license entity 210 provides the mastering facility 230 with the encryption key block MKB, i.e., an MKB 211 with which only a device having a valid license can acquire the media key [Km] and provides the content server 240 with a server private key 212.

The mastering facility 230 records the CPS unit key in the CPS unit key file (dummy) 221 received from the authoring facility 220 to generate a CPS unit key file 231 and provides the content server 240 with the CPS unit key file 231 together with the MKB 211 received from the license entity 210. The content server 240 executes encryption processing to which the media key [Km] included in the MKB is applied and generates an encrypted CPS unit key file 241.

The mastering facility 230 generates certificate data 232 including a content certificate (CC), a content hash table (CHT), and a certificate revocation list (CRL) and provides the content server 240 with the certificate data 232. In generating the certificate data 232, signature processing by the license entity 210 is executed. The certificate revocation list (CRL) is provided from the license entity 210. These kinds of processing are processing in step S22.

The mastering facility 230 further executes encryption in CPS units (step S23), to which the CPS unit key is applied, on the content subjected to authoring 222 received from the authoring facility 220 to generate encrypted content and provides the content server 240 with the encrypted content.

In step S24, the content server 240 executes encryption processing, to which the media key [Km] included in the MKB is applied, on the CPS unit key file received from the mastering facility 230 as described above and generates the encrypted CPS unit key file 241.

The content server 240 executes processing for generating a signature of a token explained with reference to FIG. 3 above by applying a server private key 245 received from the license entity 210 to the processing. This processing is bind processing in step S25 shown in FIG. 6. A token 244 is generated by this processing. As explained with reference to FIG. 3 above, signature data recorded in the token 244 may be generated in association with data including a certificate ID. In this case, the server private key 245 is applied to the data including the certificate ID to generate signature data in the bind processing.

In this way, the content server 240 obtains the encrypted CPS unit key file 241, the encrypted content 242, the certificate data 243, and the token 244. Although not shown in the figure, the content server 240 directly or indirectly receives, besides the data shown in the figure, an MKB and control information from the license entity 210. The data acquired or generated in this way are recorded in the information recording medium such as a data-recordable disk of the R type, the RE type, or the like.

In this way, when the content server provides the information recording medium such as the data-recordable disk of the R type, the RE type, or the like, the content server needs to acquire or generate various kinds of data other than the content. If these data are generated and managed by a unit of processing for providing content, an increase in a data amount is caused and processing efficiency falls.

Therefore, according to the embodiment of the present invention, a system is proposed which realizes efficiency of processing by the content server and efficiency of data provision processing for the information recording medium such as the data-recordable disk of the R type, the RE type, or the like. This system will be hereinafter explained with reference to FIG. 7 and the subsequent figures.

Figure 7:
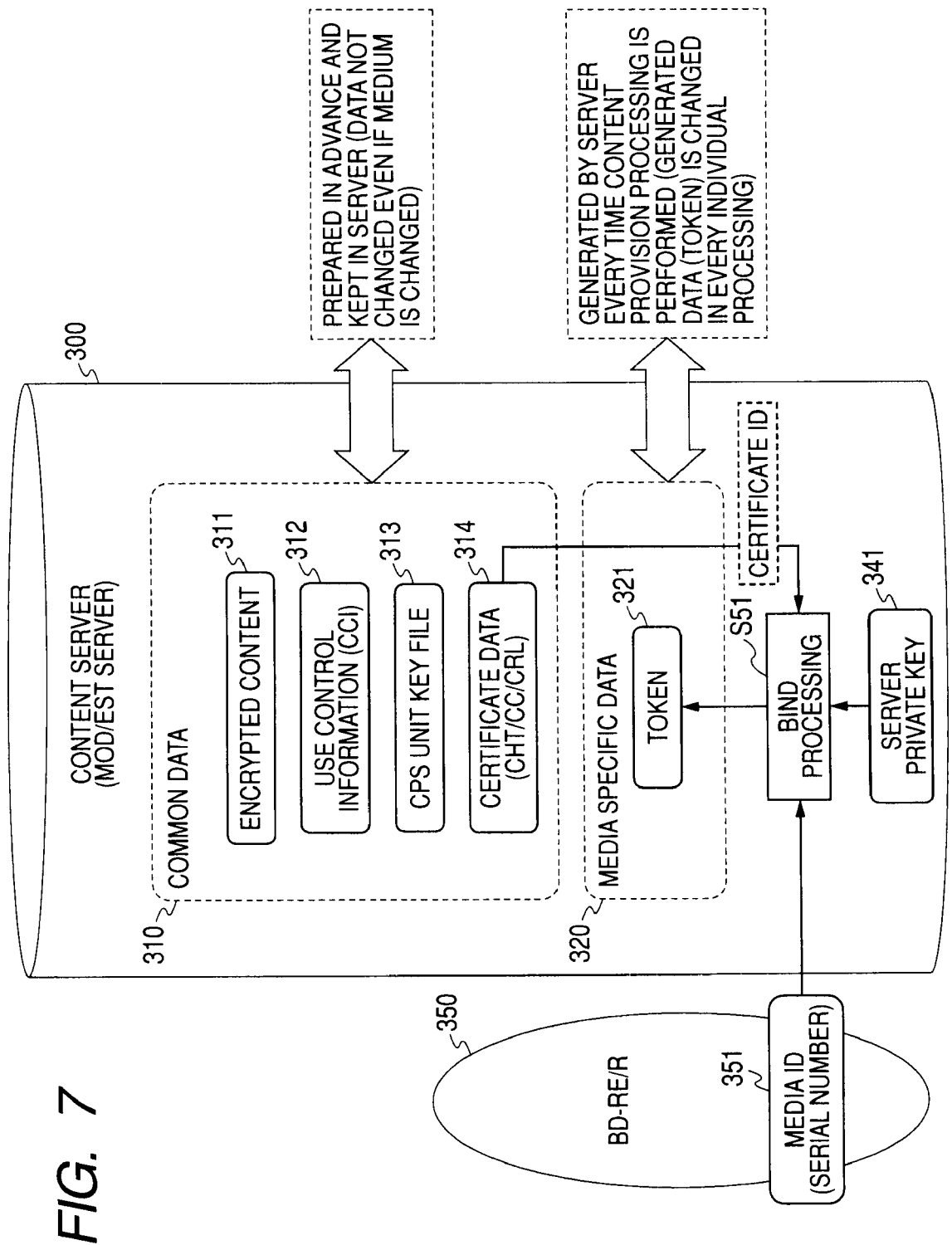
FIG. 7 is a diagram for explaining data retained by the content server and data generation processing.

FIG. 7 is a diagram for explaining the processing by the content server. A content server 300 distinguishes common data 310 that is not changed even if an information recording medium as a content recording destination is changed and media specific data 320 that is changed according to the change of the information recording medium and manages the data.

As shown in FIG. 7, the common data 300 includes an encrypted content 311, use control information 312, a CPS unit key file 313, and certificate data 314. Since these data are not changed even if a medium as a content recording destination is changed, one set of data only have to be retained in the memory.

On the other hand, as the media specific data 320, there is a token 321. The token 321 is generated by the content server 300 every time a media as a content provision destination is changed. In other words, as shown in the figure, a media ID (a serial number) 351 is acquired from an information recording medium 350 and bind processing for executing signature by the server private key (step S51) is executed to generate the token 321 including signature data. As described above, in the bind processing, i.e., the signature generation processing, signature data including an ID of certificate data may be generated.

In this way, the content server 300 realizes efficient management by distinguishing the common data 310 that is not changed even if the information recording medium as the content recording destination is changed and the media specific data 320 that is changed according to the change of the information recording medium and managing the data. In other words, the reduction of stored data and efficiency of processing for transmitting data to a recording device that actually performs processing for recording data in the medium are also realized.

Figure 8:
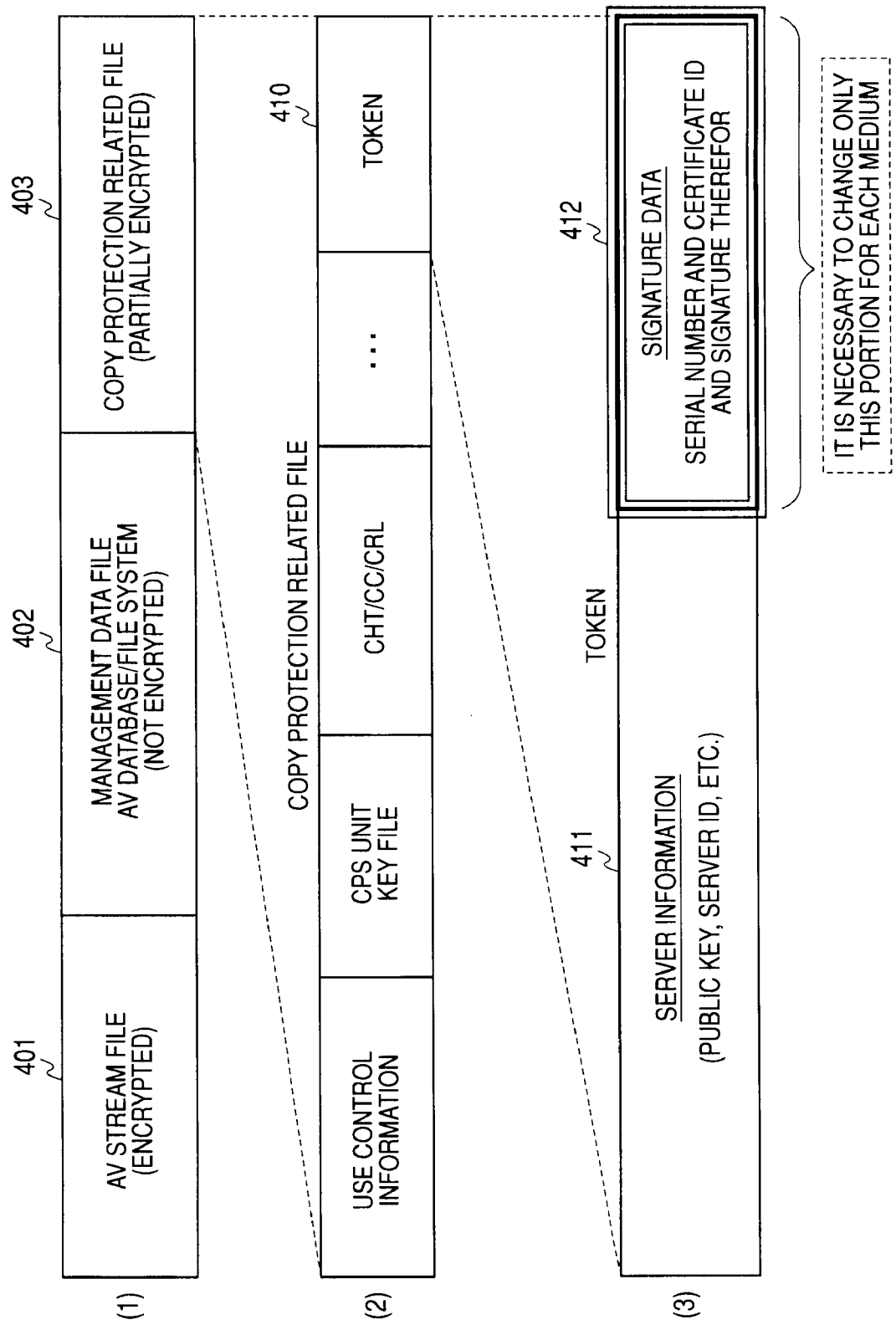
FIG. 8 is a diagram for explaining an example of a data structure provided by the content server.

A specific example of the processing for providing recording data executed by the content server will be explained with reference to FIG. 8 and the subsequent figures. FIG. 8 is a diagram for explaining data provided by the content server as recording data to be recorded in the information recording medium. The recording data provided by the content server includes, as shown in (1) in FIG. 8, an AV stream file 401, which is encrypted content, a management data file 402 including a database of management information and the like and file system information without confidentiality, and a copy protection related file 403. The file system information is information concerning a data file recorded in the information recording medium, for example, file information such as a file name and a file size of a file forming AV stream data as content.

As a specific file system, for example, a UDF (Universal Disc Format) or a BDFS (Blu-ray Disc File System) applied as a file format of Blu-ray Disc (registered trademark) is used.

The copy protection related file 403 includes, as shown in (2) in FIG. 8, the token 410 explained with reference to FIG. 3 above besides the use control information, the CPS unit key file, the certificate data (CHT/CC/CRL), and the like. The token 410 includes, as shown in (3) in FIG. 8, server information 411 including a server public key and a server ID, signature data 412, i.e., signature data 412 generated on the basis of data such as a media ID (a serial number) and a certificate ID by applying a server private key to the data. This data structure is the data structure explained with reference to FIG. 3 above.

In the data structure shown in FIG. 8, practically, data that needs to be changed according to the change of a medium is not the entire token 410 but is only the signature data 412, which is constituent data of the token 410. The data other than the signature data 412 can be common data corresponding to content.

The content server provides the recording device, which executes processing for recording these data in the information recording medium, with the data. For example, a server that performs content provision of the download type transmits the data via a network.

As a data transmission form of the content server, there are the following two forms:

(1) retention and transmission of a file system image; and
(2) retention and transmission of respective file data or packages of plural files.

(1) Retention and transmission of a file system image

In executing this processing, the content server retains the entire data shown in FIG. 8 in a form of a file system image and executes processing for transmitting the data as file system image data. The recording device that executes the processing for recording the data in the information recording medium can create a medium, in which content, management information, and the like are recorded, by directly recording the file system image in the information recording medium.

(2) Retention and transmission of respective file data or packages of plural files In executing this processing, the content server retains the individual files, which are included in the data shown in FIG. 8, as file data or packages of the files and provides the recording device, which executes data recording for each of the individual files or the packages, with the files. The recording device generates a file system image, for example, a UDF image on the basis of the received plural files and records the file system image in the information recording medium.

As an example of data transmission by the content server that executes the processing for (1) retention and transmission of the file system image, the following two examples of data transmission will be explained with reference to FIGS. 9 and 10.

(A) Block division and transmission processing
(B) Dummy data transmission and specific data overwrite and application processing First, (A) block division and transmission processing will be explained with reference to FIG. 9. FIG. 9 is a diagram showing data structures of (1) transmission data from the content server and (2) data recorded on a medium at the time when the block division and transmission processing is executed.

The server transmission data shown in (1) in FIG. 9 includes the data explained with reference to FIG. 8. A copy protection related file 501 corresponds to the copy protection related file data in (2) in FIG. 8. A part of the copy protection related file 501 is media specific data 502. The media specific data 502 corresponds to the signature data 412 shown in FIG. 8.

Figure 9:
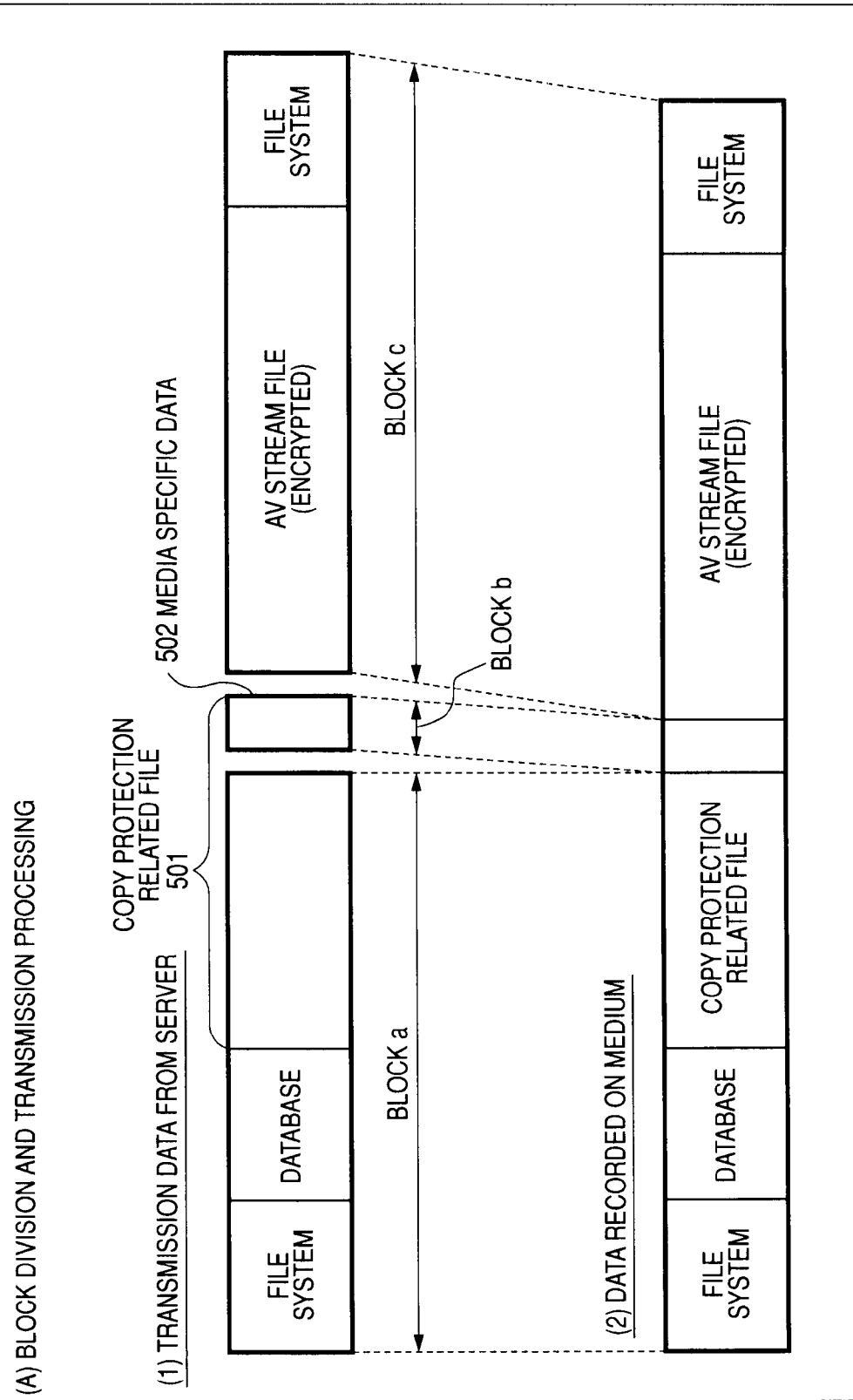
FIG. 9 is a diagram for explaining data provided by the content server and data recorded in an information recording medium.

As shown in (1) in FIG. 9, the content server sets the media specific data as an independent transmission data block B. The content server sets common data other than the media specific data as one or more transmission blocks. In the example shown in FIG. 9, the content server sets the following three blocks.

Block a: common data
Block b: media specific data
Block c: common data

The content server that executes transmission or output of content demarcates the data for each of the blocks and executes transmission or output of the data. As a unit of data transmission, one block does not need to be a unit of one transmission. One block may be demarcated into plural transmission units, for example, transmission packets and transmitted. In other words, the demarcation of the blocks only has to be set such that the recording device that receives or is inputted with the data can distinguish the blocks.

The recording device distinguishes the following three blocks and executes data recording in the medium.

Block a: common data
Block b: media specific data
Block c: common data

As a result, as shown in (2) in FIG. 9, according to the data recording in a unit of blocks, the common data block a, the media specific data block b, and the common data block c can be recorded without being mixed.

An example of data transmission processing based on (B) dummy data transmission and specific data overwrite and application processing will be explained with reference to FIG. 10. FIG. 10 is a diagram showing data structures of (1a) transmission data from the content server (part 1), (1b) transmission data from the content server (part 2), (2) data initially recorded on the medium, and (3) data finally recorded on the medium.

Figure 10:
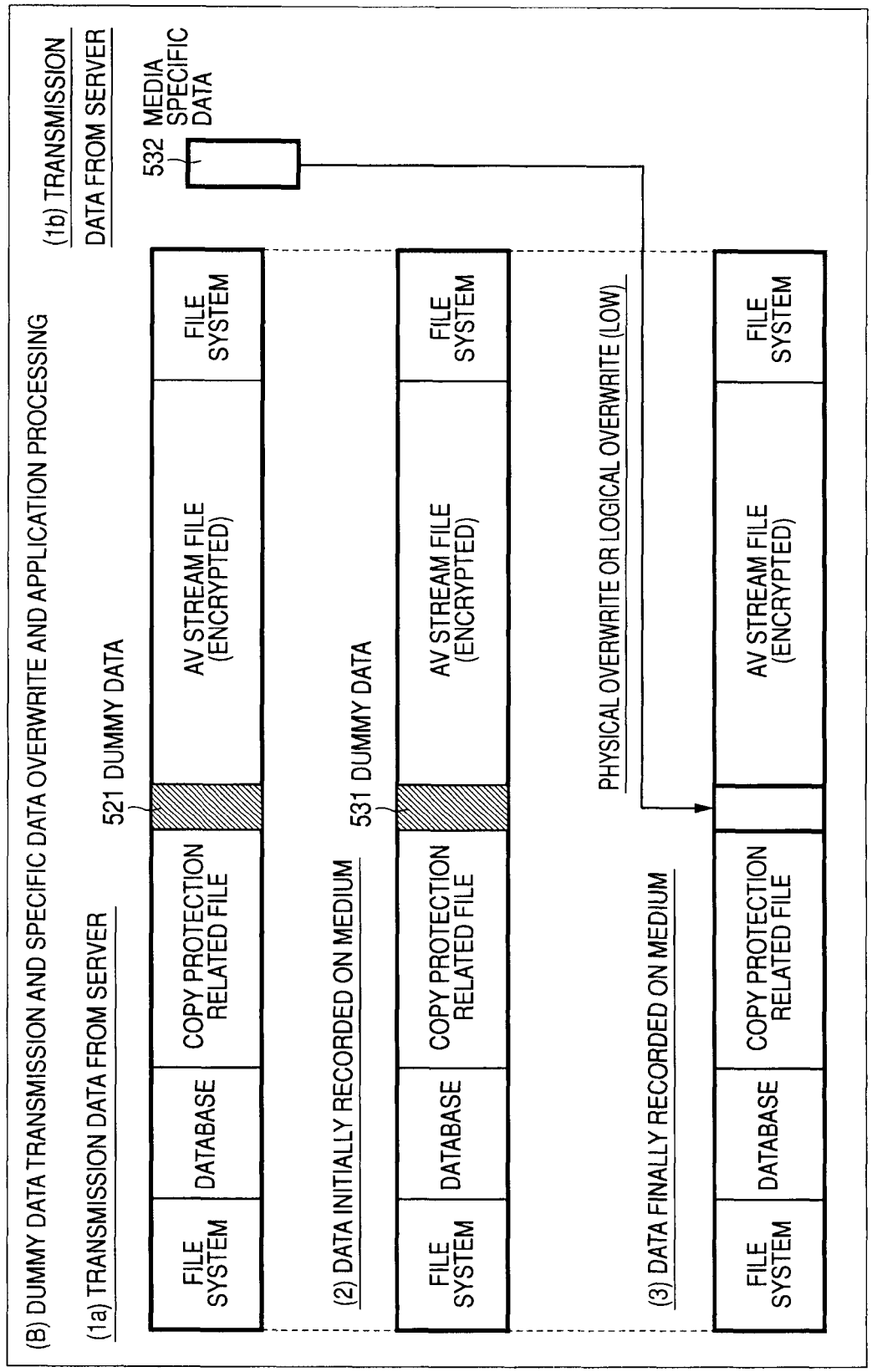
FIG. 10 is a diagram for explaining data provided by the content server and data recorded in the information recording medium.

In an example of data transmission processing shown in FIG. 10, the content server transmits the transmission data (part 1) and the transmission data (part 2).

(1a) the transmission data from the content server (part 1) has, concerning common data, the data structure explained with reference to FIG. 8. The content server generates data obtained by setting dummy data 521 in a writing region of the signature data 412 shown in FIG. 8, which is the media specific data set in a part of the copy protection related file, and outputs the data.

The content server outputs the transmission data (part 2) as data separate from the transmission data (part 1). The transmission data (part 2) is media specific data 532 and includes only the signature data 412 shown in FIG. 8.

First, the recording device that executes data recording in the information recording medium receives or is inputted with (1a) the transmission data from the content server (part 1) and records (2) the data initially recorded on the medium shown in (2) in FIG. 10 in the information recording medium as data including dummy data.

As shown in (2) in FIG. 10, this recording data corresponds to the server transmission data (part 1) shown in (1) in FIG. 10. The media specific data in the data structure shown in FIG. 8 is replaced with dummy data 531.

First, the recording device that executes data recording in the information recording medium receives or is inputted with (1b) the transmission data from the server (part 2).

This data is the media specific data 532, i.e., data corresponding to the signature data 412 shown in FIG. 8.

The recording device executes processing for recording this data in place of the dummy data. In performing data writing in a medium in which data is re-recordable, the recording device executes processing for overwriting the media specific data 532 on a dummy data recorded section.

When a medium is not the medium in which data is re-recordable, the recording device executes logical overwrite processing, for example, logical over write (LOW). The LOW is a recording system for writing the media specific data 532 in an alternate region corresponding to the recording region of the dummy data, setting the dummy data as a non-readable region, and making the media specific data 532 recorded in the alternate region readable using an address corresponding to the recording region of the dummy data.

An example of data transmission by the content server that executes (2) retention and transmission of respective file data or packages of plural files will be explained with reference to FIG. 11.

Figure 11:
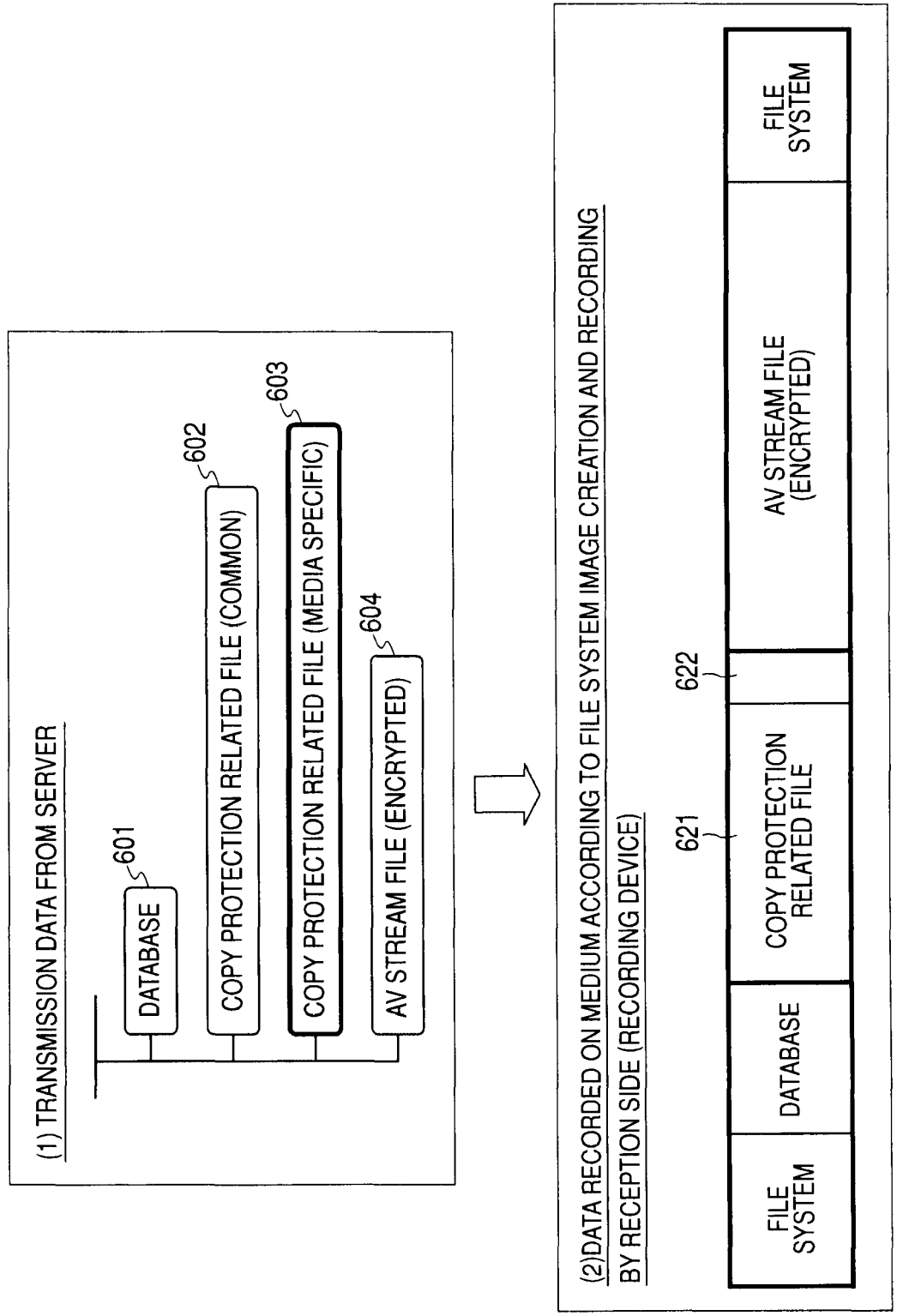
FIG. 11 is a diagram for explaining data provided by the content server and data recorded in the information recording medium.

(1) in FIG. 11 shows transmission data of the content server. The content server retains the data explained with reference to FIG. 8 above as individual files or packages. In the example shown in FIG. 11, the content server retains a database file 601, a copy protection related file (common) 602, a copy protection related file (media specific) 603, and an AV stream file (encrypted) 604. In this case, as in the case described above, the server retains media specific data as an independent file.

The recording device that executes data recording in the information recording medium separately establishes received file system information or file system information of its own, generates, in accordance with the file system, a file system image based on a file or a file package individually transmitted from the content server, and records the file system image in the information recording medium. As shown in (2) in FIG. 11, data in which media specific data 622 is recorded as a part of copy protection related file 621 is recorded.

In all the cases in FIGS. 9 to 11, the content server that provides content distinguishes and manages the common data that is not changed even if the information recording medium as the content recording destination is changed and the media specific data that is changed according to the change of the information recording medium. The content server distinguishes and executes transmission or output processing of the common data and the media specific data. According to this processing, the recording device that executes data recording in the medium can surely record the common data and the media specific data in the medium and finally complete the recording of the data having the structure shown in FIG. 8.

3. A structure of the information processing device

Figure 12:
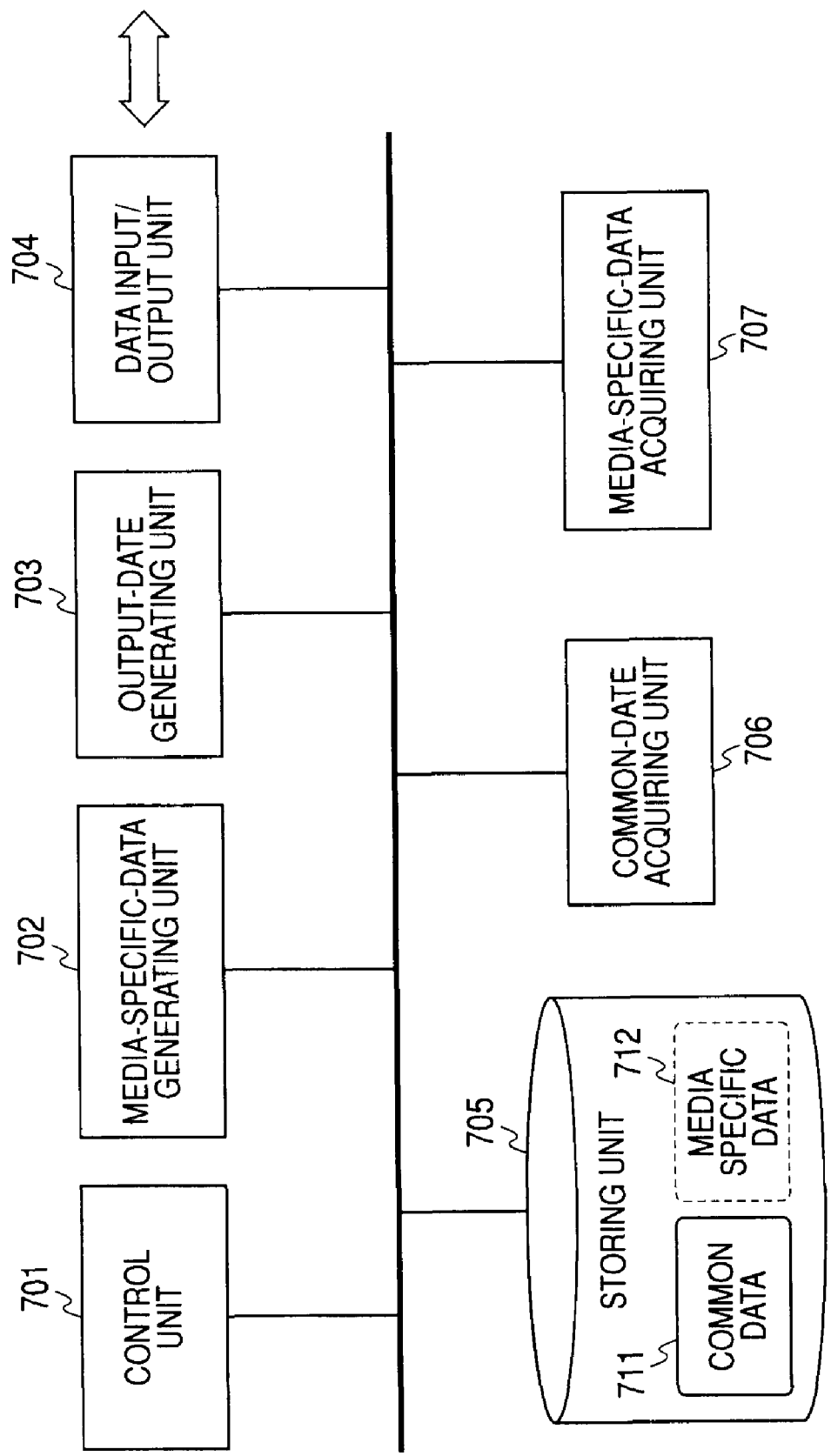
FIG. 12 is a diagram for explaining a structure and functions of the content server.
Figure 13:
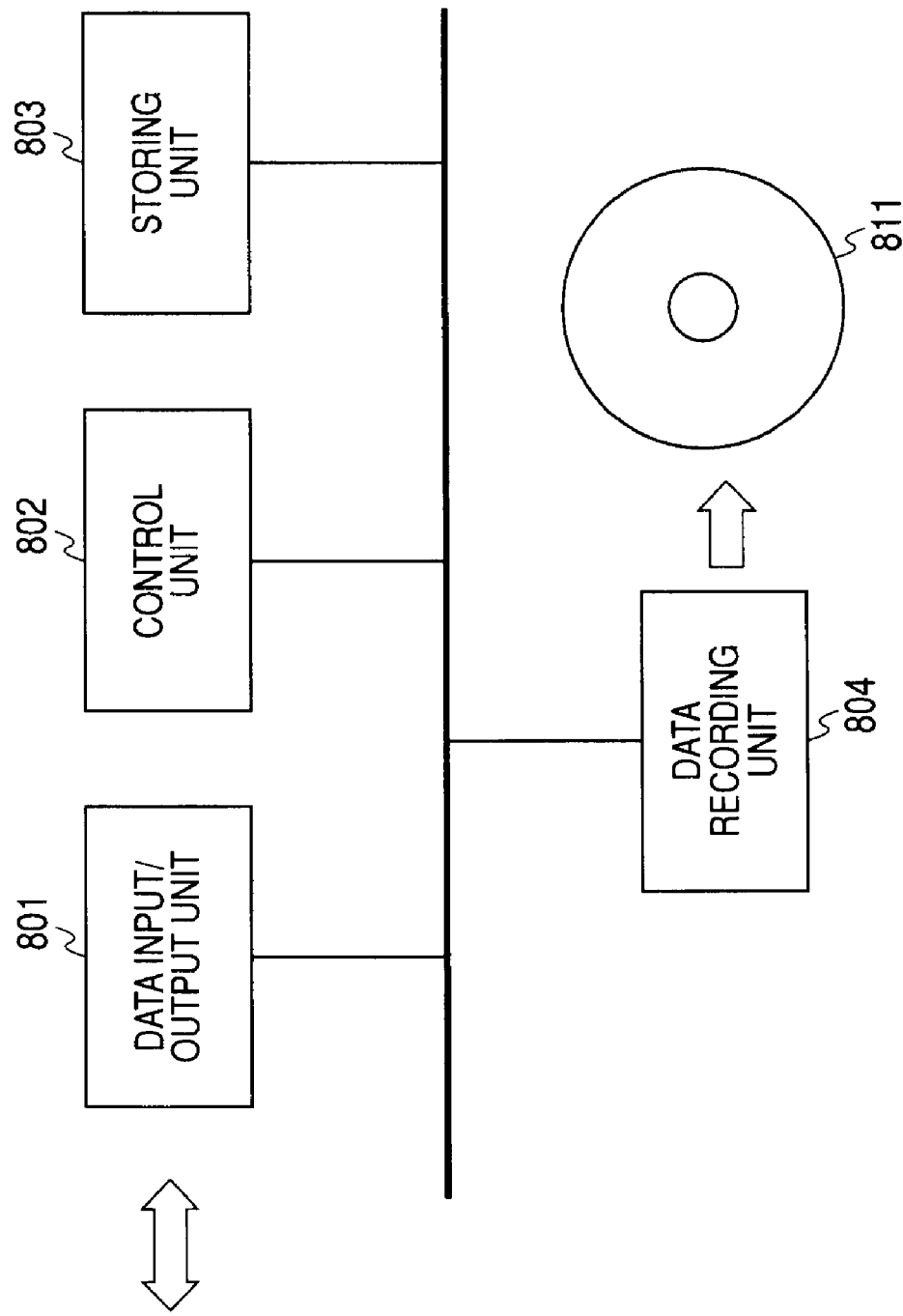
FIG. 13 is a diagram for explaining a structure and functions of an apparatus that records data in the information recording medium.

Structures of the content server that executes transmission or output of content and the information processing device as the recording device that executes processing for data recording in the information recording medium will be explained with reference to FIGS. 12 and 13.

First, a structure and functions of the content server that executes transmission or output of content will be explained with reference to FIG. 12. As shown in FIG. 12, the content server that executes processing for providing content includes a control unit 701 that executes overall control of generation and output of output data, a media-specific-data generating unit 702 that generates media specific data, an output-data generating unit 703 that generates output data including both common data and media specific data, a data input/output unit 704 that outputs recording data to the recording device, which executes data recording processing, and executes input and the like of a media ID of a recording destination, a storing unit 705 that stores common data 711, media specific data 712, a processing program, and the like, a common-data acquiring unit 706 that acquires the common data from the storing unit 705 and outputs the common data to the output-data generating unit 703, and a media-specific-data acquiring unit 707 that acquires the media specific data from the storing unit 705 and outputs the media specific data to the output-data generating unit 703.

In the figure, the media specific data 712 is stored in the storing unit 705. However, since the media specific data is information generated by the media-specific-data generating unit 702, the media specific data may be directly passed to the output-data generating unit 703 without being recorded in the storing unit 705.

The common data 711 stored in the storing unit 705 shown in the figure is specifically common data 711 that includes the common data and the like in the data shown in FIG. 8 and includes encrypted content, key information applied to decoding of the encrypted content, and content management information and, data content of which is not changed even if a medium as a data recording destination is changed.

The media-specific-data generating unit 702 is inputted with a media identifier specific to the media as the data recording destination or the media identifier and identification information of a content certificate included in management information and generates media specific data including electronic signature data corresponding to these data. In other words, the media-specific-data generating unit 702 generates the token explained with reference to FIG. 3.

As a form of processing for generating output data by the output-data generating unit 703, there are the plural forms explained with reference to FIGS. 9 to 11 above. For example, there are the plural forms: (1) retention and transmission of a file system image explained with reference to FIGS. 9 and 10 and (2) retention and transmission of respective file data or packages of plural files explained with reference to FIG. 11.

When (1) retention and transmission of a file system image is performed, there are two forms: (A) block division and transmission processing and (B) dummy data transmission and specific data overwrite and application processing.

In executing the block division and transmission processing explained with reference to FIG. 9, the output-data generating unit 703 sets the common data and the media specific data as different data blocks and generates output data in a unit of the set data blocks. The data input/output unit 704 executes processing for outputting data in a unit of data blocks.

In executing the dummy data transmission and specific data overwrite and application processing explained with reference to FIG. 10, the output-data generating unit 703 generates two output data, i.e., first output data as data including the common data and obtained by replacing the media specific data with dummy data and second output data as the media specific data. The data input/output unit 704 executes processing for outputting the first output data and the second output data.

In performing the transmission of respective file data or packages of plural files explained with reference to FIG. 11, the output-data generating unit 703 generates common-data-file output data formed by a file or a file package including the common data and media-specific-data-file output data formed by a file or a file package including the media specific data. The data input/output unit 704 executes processing for outputting the common-data-file output data and the media-specific-data-file output data.

Functions and a structure of the information processing device that is inputted with data from the content server and executes processing for data recording in the information recording medium will be explained with reference to FIG. 13. The information processing device serving as the recording device includes, as shown in FIG. 13, a data input/output unit 801 that executes data input and output to and from the content server, a control unit 802 that executes overall control of data input and data recording, a storing unit 803 that stores input data, recording data, a processing program, and the like, and a data recording unit 804 that executes processing for data recording in an information recording medium 811.

The data input/output unit 801 is inputted with, from the content server, common data that includes encrypted content, key information applied to decoding of the encrypted content, and content management information and, data content of which is not changed even if a medium as a data recording destination is changed, and media specific data, data content of which is changed according to the change of the medium as the data recording destination. The data recording unit 804 executes processing for recording data inputted via the data input/output unit 801 in the information recording medium 811. The data recording unit 804 executes processing for recording a file system image including the common data and the media specific data in the medium.

As the data inputted by the data input/output unit 801, there are various forms as explained with reference to FIGS. 9 to 11 above. Forms of the recording processing executed by the data recording unit 804 are different depending on these data forms.

For example, when the content server executes the block division and transmission processing explained with reference to FIG. 9, the data input/output unit 801 inputs block-identifiable data in which the common data and the media specific data are set in separate data blocks. The data recording unit 804 identifies, on the basis of the block-identifiable data, the common data and the media specific data and executes data recording processing.

When the content server performs the transmission of the dummy data and the specific data explained with reference to FIG. 10, the data input/output unit 801 inputs first input data including the common data and obtained by replacing the media specific data with dummy data and second input data including the media specific data. The data recording unit 804 records the first input data in the medium and, then, overwrites or logically overwrites the second input data on the dummy data of the first input data.

As explained with reference to FIG. 11, when the content server transmits data including a file or a file package, the data input/output unit 801 inputs a common data file formed by a file or a file package including the common data and a media specific data file formed by a file or a file package including the media specific data. The data recording unit 804 generates a file system image based on the common data file and the media specific data file and records data in the medium.

The present invention has been explained in detail with reference to the specific embodiment. However, it is obvious that those skilled in the art can perform alteration and substitution of the embodiment without departing from the spirit of the present invention. In other words, the present invention has been disclosed in the form of illustration and should no be limitedly interpreted. To judge the gist of the present invention, the appended claims should be taken into account.

The series of processing explained in the specification can be executed by hardware, software, or a combination of the hardware and the software. When the series of processing is executed by the software, it is possible to install a computer program having a processing sequence recorded therein in a memory in a computer built in dedicated hardware and cause the computer to execute the computer program. Alternatively, it is possible to install the computer program in a general-purpose computer capable of executing various kinds of processing and cause the computer to execute the computer program.

For example, it is possible to store the computer program in a hard disk or a ROM (Read Only Memory) as recording media in advance. Alternatively, it is possible to temporarily or permanently store (record) the computer program in a removable recording medium such as a flexible disk, a CD-ROM (Compact Disc Read Only Memory), an MO (Magneto Optical) disk, a DVD (Digital Versatile Disc), a magnetic disk, or a semiconductor memory. It is possible to provide such a removable recording medium as so-called package software.

Other than installing the computer program in the computer from the removable recording medium described above, it is also possible to transfer the computer program from a download site to the computer by radio or transfer the computer program from the download site to the computer by wire through a network such as a LAN (Local Area Network) or the Internet. The computer can receive the computer program transferred and install the computer program in a recording medium such as a hard disk built therein.

The various kinds of processing described in this specification do not always have to be processed in time series according to the description. The various kinds of processing may be executed in parallel or individually according to the processing ability of a device that executes the processing or when necessary. The system in this specification is a logical set of plural apparatuses and is not limited to a system in which apparatuses of various structures are provided in the same housing.

As explained above, according to the embodiment of the present invention, in the system that records content to be subjected to use control in a data-writable medium of the R type or the RE type using download from a server or a public terminal, media specific data and common data, which is not specific to the medium, are sectioned and managed and these respective data are set to be identifiable and outputted from the server to the recording device. According to the application of the system, the server is capable of storing one set of common data independent of a medium and generating and outputting data specific to the medium one by one. In data output processing, efficiency of data output processing in the server is improved by performing processing for outputting the common data and the media specific data as separate blocks and processing for outputting data in which dummy data is set and replacing the dummy data with the media specific data. This makes it possible to perform efficient and sure data recording in the recording device that records data.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing device for outputting recording data to an information recording medium, the information processing device comprising:
   a storing unit that stores common data that includes encrypted content, key information applied to decoding of the encrypted content, and content management information, data content of the common data being unchanged even if a medium as a data recording destination is changed;
   a media-specific-data generating unit that generates media specific data, data content of the media specific data being changed according to the medium as the data recording destination;
   an output-data generating unit that generates first and second output data by setting the first output data to include the common data and data to be obtained by replacing the media specific data with dummy data, and by setting the second output data to be the media specific data; and
   a data outputting unit that outputs the first and second output data generated by the output-data generating unit.

2. The information processing device according to claim 1, wherein the media-specific-data generating unit receives a media identifier specific to the medium as the data recording destination and generates the media specific data including electronic signature data corresponding to data including the media identifier.

3. The information processing device according to claim 1, wherein the media-specific-data generating unit receives a media identifier specific to the medium as the data recording destination and identification information of a content certificate included in the content management information, and generates the media specific data including electronic signature data corresponding to data including the media identifier and the content certificate.

4. An information processing device for recording input data in an information recording medium, the information processing device comprising:
   a data inputting unit that receives first and second input data, the first input data including common data and data obtained by replacing media specific data with dummy data, and the second input data including the media specific data, the common data including encrypted content, key information applied to decoding of the encrypted content, and content management information, data content of the common data being unchanged even if a medium as a data recording destination is changed, and data content of the media specific data being changed according to the medium as the data recording destination; and
   a data recording unit that records the first and second input data received via the data inputting unit in the medium, wherein
   the data recording unit records a file system image including the common data and the media specific data in the medium by recording the first input data in the medium, and then by overwriting or logically overwriting the second input data on top of the dummy data of the first input data.

5. An information processing method of outputting recording data to an information recording medium in an information processing device, the information processing method comprising:
   generating, in a media-specific-data generating unit, media specific data, data content of the media specific data being changed according to a medium as a data recording destination;
   acquiring, in an output-data generating unit, common data that includes encrypted content, key information applied to decoding of the encrypted content, and content management information, data content of the common data being unchanged even if the medium as the data recording destination is changed;
   generating first and second output data, the first output data including the common data and data obtained by replacing the media specific data with dummy data, and the second output data including the media specific data; and outputting, via a data outputting unit, the first and second output data generated in the generating the first and second output data.

6. The information processing method according to claim 5, further comprising:

receiving a media identifier specific to the medium as the data recording destination, the media specific data including electronic signature data corresponding to data including the media identifier.

7. The information processing method according to claim 5, further comprising:

receiving a media identifier specific to the medium as the data recording destination and identification information of a content certificate included in the content management information, the media specific data including electronic signature data corresponding to data including the media identifier and the content certificate.

8. An information processing method of recording input data in an information recording medium in an information processing device, the information processing method comprising:

receiving first and second input data, the first input data including common data and data obtained by replacing media specific data with dummy data, the second input data including the media specific data, the common data including encrypted content, key information applied to decoding of the encrypted content, and content management information, data content of the common data being unchanged even if a medium as a data recording destination is changed, and data content of the media specific data being changed according to the medium as the data recording destination; and recording, via a data recording unit, the first and second input data in the medium, wherein the recording includes recording a file system image including the common data and the media specific data in the medium by recording the first input data in the medium, and then overwriting or logically overwriting the second input data on top of the dummy data of the first input data.

9. A non-transitory computer-readable medium having instructions recorded thereon that when executed by a processor cause the processor to perform steps comprising:

generating, via a media specific data generating unit, media specific data, data content of the media specific data being changed according to a medium as a data recording destination;

acquiring common data that includes encrypted content, key information applied to decoding of the encrypted content, and content management information, data content of the common data being unchanged even if the medium as the data recording destination is changed;

generating, via a data generating unit, first and second output data, the first output data including the common data and data obtained by replacing the media specific data with dummy data, and the second output data including the media specific data; and outputting, via a data outputting unit, the first and second output data generated in the generating the first and second output data.

10. A non-transitory computer-readable medium having instructions recorded thereon that when executed by a processor cause the processor to perform steps comprising:

receiving, via a data inputting unit, first and second input data, the first input data including common data and data obtained by replacing media specific data with dummy data, the second input data including the media specific data, the common data including encrypted content, key information applied to decoding of the encrypted content, and content management information, data content of the common data being unchanged even if a medium as a data recording destination is changed, and content data of the media specific data being changed according to the medium as the data recording destination; and recording, via a data recording unit, the first and second input data in the medium, wherein the recording includes recording a file system image including the common data and the media specific data in the medium by recording the first input data in the medium, and then overwriting or logically overwriting the second input data on top of the dummy data of the first input data.

* * * * *